Figure 1:
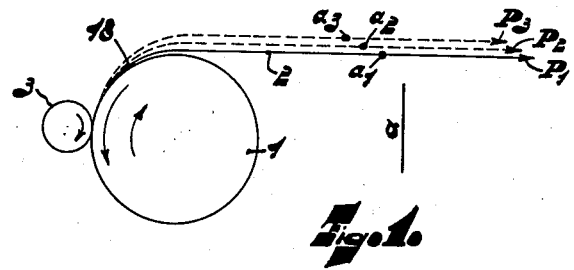

Sept. 3, 1940.   J. J. KOTTE   2,213,250
FILM APPARATUS
Filed Nov. 13, 1937   2 Sheets-Sheet 1

INVENTOR
J. J. Kotte
BY
E. F. Wadsworth
ATTORNEY

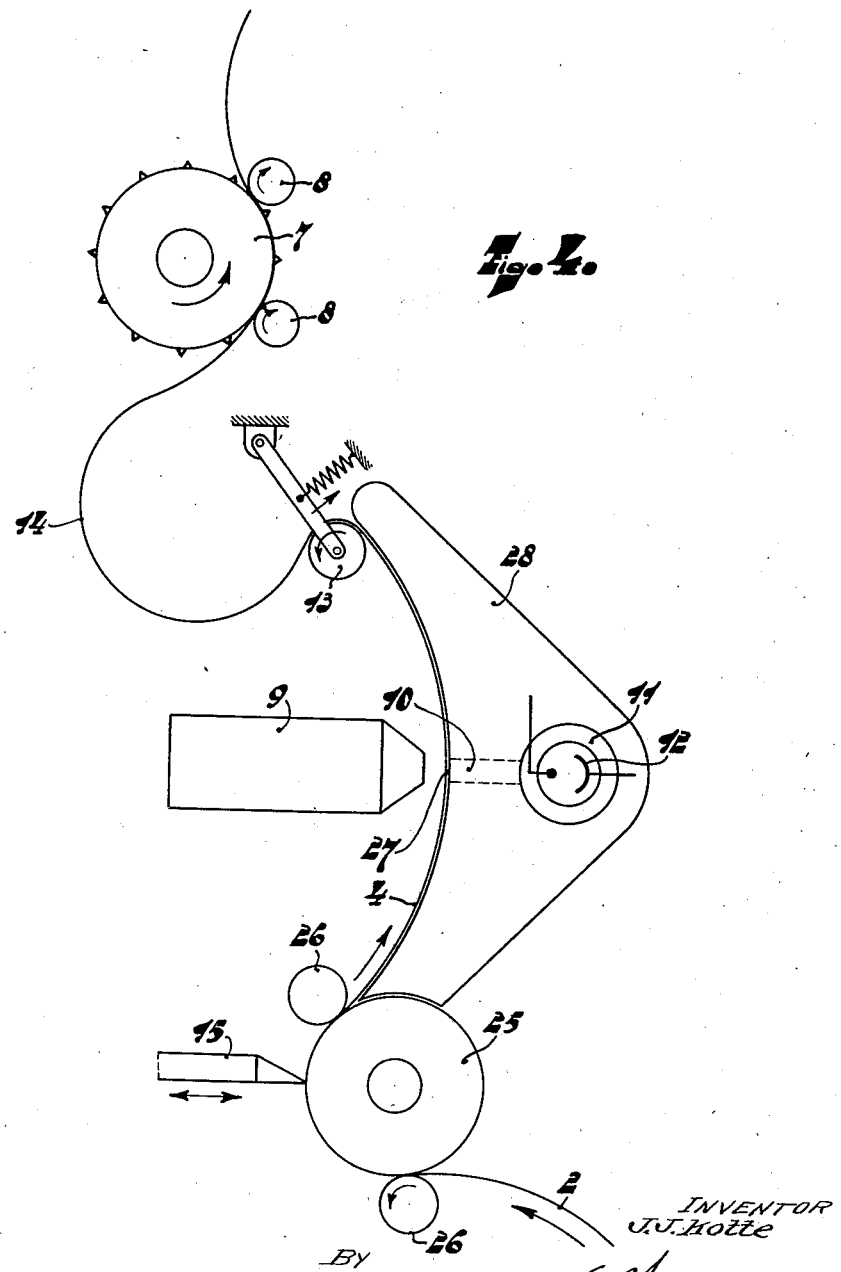

Patented Sept. 3, 1940

2,213,250

UNITED STATES PATENT OFFICE 2,213,250

FILM APPARATUS

Jan Jacob Kotte, Eindhoven, Netherlands, assignor, by mesne assignments, to Hartford National Bank and Trust Company, Hartford, Conn., as trustee Application November 13, 1937, Serial No. 174,459
In Germany November 27, 1936

7 Claims. (Cl. 179—100.4)

My invention relates to film apparatus of the type in which the film at the sound control point i. e. the point at which the sound is recorded on or reproduced from the film, travels along a stationary path.

My invention is adapted for use in apparatus for recording or reproducing sound or sound-picture films, and is particularly useful in connection with apparatus for recording or reproducing films having an optically-reproducible sound track which is mechanically recorded in the manner described in U. S. Patent 1,919,116 to James A. Miller.

In apparatus in which the film travels along a fixed path at the sound point, it is the usual practice to provide before or behind this film path one or more rollers which maintain the speed of the film constant. These rollers may, for instance, be provided with a flywheel, and may be either coupled to a driving motor or driven by the film itself. At the side of the film path opposite these rollers, a device is usually provided to produce a tension in the film so that it will pass the sound point in a stretched condition. Although it has been believed that such a construction would produce a constant speed of the film past the sound point, I have found that this is not the case. More particularly, I have found that in such apparatus there are variations in the film speed at the sound point which deleteriously effect the reproduction, and that these variations are due to changes in the tension in the film, as will be explained more fully hereinafter.

The object of my invention is to insure a constant speed of the film at the sound point and for this purpose I guide the film in a constrained manner between the sound point and the member serving to maintain the film speed constant at this point, to thereby prevent the formation of a loop or variations in loop in the film due to variable stresses therein. More particularly, I constrain the film from the sound point to the above member, by a film guide having an arched surface which engages the film to restrict the movement thereof to a definite path. The film guide may be a separate member, or the surface guiding the film at the sound point may be extended to the constant speed driving member.

In one embodiment of my invention, which is adapted to certain types of apparatus in which a sprocket is used on the side of the sound point at which the film leaves, I form a free loop in the film between the sprocket and sound point.

Figure 2:
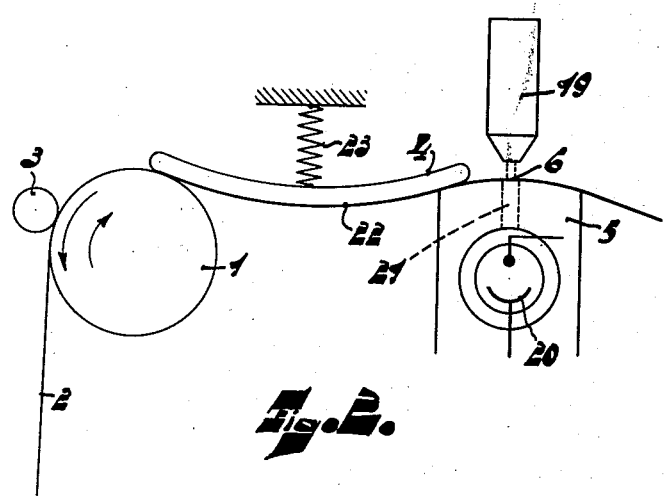
Figure 3:
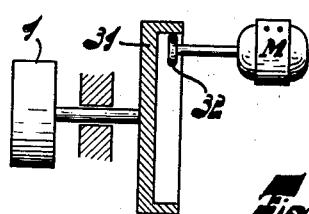

In order that my invention may be clearly understood and readily carried into effect, I shall describe the same in more detail with reference to the accompanying drawings, in which:

Figure 1 is a diagrammatic view of a portion of a film apparatus according to the prior art, Fig. 2 is a diagrammatic view of a portion of a film apparatus embodying the invention, Fig. 3 is a partly-sectioned view of the driving device of Fig. 2, and Fig. 4 is a diagrammatic view of a portion of a film apparatus and illustrates another embodiment of the invention.

In Fig. 1 a film 2 is driven at a constant speed and in a slip-free manner by a smooth-faced driving roller and a cooperating pressing roller 3. Owing to the stiffness of the film, which manifests itself as definite bending strength at this point, the film does not engage the surface of roller in the tangent plane, but forms a loop 18 of variable shape which becomes more remote from the surface of the roller as the tension P within film becomes lower and the stiffness of the film becomes greater. With variable values of tension P, i. e. $P_1 > P_2 > P_3$, the curvature of loop 18 varies, and consequently also the positions of a definite point of the film i. e. a definite point will assume the corresponding positions $a_1$, $a_2$, and $a_3$. Thus, even if roller 1 rotates at a constant speed, the speed of the film 1 at a point $a$ cannot be constant, when tension P varies a slight amount.

It will be obvious that a similar variation in speed results if a compressive force is exerted on the film, instead of tensile force P, provided the film does not buckle.

I have found in practice, the tensile force P cannot generally be maintained constant within sufficiently narrow limits, because of variable friction of rollers and stretching levers, shocks due to sprockets engaging the film, irregularities of toothed wheels in the driving means, friction differences at the different points of the film on the film path due to different surface properties, etc. Even very slight variations in the tensile force P will cause a definite, although comparatively small variation in the position of the point $a$ of the film. However, as the variations in the shape of the sound track on the film, particularly with high frequencies, are of the same order of magnitude, as the variation of the point $a$ on the film, the sound becomes hoarse even with the slightest variations in the tension of the film.

As shown in Fig. 2, the film 2 is moved at a constant speed by a roller 1. As illustrated in Fig. 3, roller 1 is mounted on a shaft with a flywheel 31. Engaging the inner surface of the flywheel is a small roller 32 of frictional material mounted on the shaft of a constant-speed motor M.

The film passes between a suitable light-source and optical system 19, and a photo-electric cell 20 disposed within a member 5 provided with a bore 21 for the passage of light. Member 5 has a curved surface 6 forming a stationary path for the film at the sound point.

In accordance with the invention, I guide the portion of the film between surface 6 and roller 1 in a constrained manner by means of a guide 4 having a convex surface 22. A compression spring 23 acts upon guide 4 to press film 2 against the edge of member 5 and roller 1. With this construction, variations in the tension within the film will not cause variations in its speed at the sound point because the length of this film between roller 1 and surface 6 will remain the same under all operating conditions.

Although a construction such as shown in Fig. 2 gives entirely satisfactory results in recording or reproducing I prefer to further improve the sound purity in definite cases, for instance in synchronous installations in which a picture-film and sound-film are synchronized by sprockets. More particularly, in such cases I prefer to drive the film on one side of the sound control point by a sprocket, and to form between the sound control point and this sprocket a free loop in the film. Such a construction ensures that tooth shocks introduced by the sprockets and any shocks in the coupling of the winding or unwinding spool will not affect the film movement at the sound control point and thus mar the reproduction. In fact the tooth shocks produced in the film are damped in this case by the free loop. This result cannot be ensured by keeping the film taut by a mechanical device of comparatively large mass provided between the sprocket and the film path, such as are used in known devices.

I am aware that this effect of a free loop in sound film apparatus is known per se, however, the present invention relates to a particular kind of film guiding or driving means, in which this property of the film loop is utilized in a suitable manner.

Such a construction is shown in Fig. 4, in which the film 2 is driven at a constant speed by a smooth-faced roller 25, and is pressed against the surface of this roller by two pressing rollers 26. Roller 25 may be driven in the manner shown in Fig. 3, but is preferably coupled to the driving means of the apparatus (not shown) through a coupling arrangement of known type which has a transmission ratio of the variable type whereby the film may be maintained at a constant speed even in case of shrinkage. Such a device has been illustrated and described in the U. S. Patent No. 1,256,286.

Upon leaving roller 25 the film then passes along the concave surface 27 of a member 28 provided with a bore 11 in which is located a photoelectric cell 12. A suitable light source and optical system 9 provides the necessary light which passes through the film and a bore 10 in member 28 to the photo cell 12.

It will be noted that film 2 leaves roller 25 at an angle equal to or greater than the angle of the tangent at this point, whereby the film, because of its stiffness, presses against surface 27 and remains in contact therewith. Upon leaving surface 27 the film passes over a freely rotating pressing roller 13, forms a free loop 14, and then passes over a sprocket 7 to which it is pressed by pressing rollers 8. Sprocket 7 serves to drive the film and is rotated at a substantially constant speed by a suitable driving mechanism (not shown).

In most cases loop 14 exerts sufficient pressure against the pushing effect of roller 25 to maintain the film in contact with surface 27 throughout its extent. However in some instances it is preferable to use pressing roller 13 to press the film slightly against surface 27.

The arrangement illustrated in Fig. 4 is particularly advantageous for mechanically recording on a pure sound film an optically-reproducible sound record which has to be later copied on a positive picture film. In such cases, the sprocket 7 ensures that the film will travel in synchronism with the corresponding picture film. The mechanical recording may be effected by the method described in the above-mentioned Patent 1,919,116. For this purpose, a cutting tool 15 having a V shaped cutting edge is vibrated in the direction of the double-headed arrow to cut a sound track in the film 2. In this case the sound may be reproduced immediately after the recording, and this reproduction used to control the recording.

While I have described my invention in connection with specific applications and examples, I do not wish to be limited thereto but desire the appended claims to be construed as broadly as permissible in view of the prior art.

What I claim is:

1. An apparatus for driving a film at a constant speed past a sound-control point, comprising means for moving the film at a constant speed at a point spaced from the sound-control point and including a constant-speed roller, means for guiding the film-portion between the sound-control point and the constant-speed roller including a member having a curved surface engaging only one side of said film-portion over its entire length, means for keeping said film-portion under a mechanical stress of constant direction with the resulting force of the stress directed toward said curved surface, said latter means including said constant-speed roller, and means for pressing the film against said curved surface at the point at which the curvature of the film changes from that of the surface to that of the constant-speed roller.

2. An apparatus for driving a film at a constant speed past a sound-control point, comprising means for moving the film at a constant speed at a point spaced from the sound-control point and including a constant-speed roller, means for guiding the film-portion between the sound-control point and the constant-speed roller including a member having a curved surface engaging only one side of the film-portion over its entire length, the direction of curvature of said curved surface being opposite to that of the constant-speed roller, means for keeping the film-portion under a mechanical stress of constant direction with the resulting force of the stress directed towards said curved surface, said latter means including said constant-speed roller, and means for pressing the film to the curved surface at the point at which the radius of curvature of the film changes from that of the surface to that of the constant-speed roller.

3. An apparatus for driving a film at a constant speed past a sound-control point, comprising means for moving the film at a constant speed at a point spaced from the sound-control point, a member at the sound-control point and having a film-guiding surface, a guide having a convex surface for confining to a fixed path the entire film-portion between said film-guiding surface and the surface of the constant-speed roller, said convex surface being in contact with the surface of the film opposite to the surface which is in contact with the surfaces of said constant-speed roller and member, and means for keeping said film-portion in tension including said constant-speed roller.

4. An apparatus for driving a film at a constant speed past a sound-control point, comprising means for moving the film at a constant speed at a point spaced from the sound-control point and including a constant-speed roller, a member having a convex film-guiding surface at the sound-control point, a guide having a convex surface in contact with the entire film-portion between the film-guiding surface and the surface of said constant-speed roller, the convex surface of said guide being in contact with the film-surface opposite that which is in contact with the surface of said constant-speed roller and said film-guiding surface, and means acting upon said guide to press the film against the surfaces of said constant-speed roller and said member at the ends of the effective portion of the convex surface of the guide.

5. An apparatus for driving a film at a constant speed past a sound-control point and including a constant-speed roller spaced from said point and provided with a smooth-faced film-driving surface, a member having a concave surface in contact with only one side of the entire film-portion between said constant-speed roller and the sound-control point, the direction of curvature of said concave surface being opposite to the film-driving surface, and means to maintain said film-portion in compression so as to keep the same in contact with said concave surface, said latter means including said constant-speed roller.

6. An apparatus for driving a film at a constant speed past a sound-control point and including a constant-speed roller spaced from said point and provided with a smooth-faced film-driving surface, a member having a concave surface in contact with only one side of the entire film-portion between said constant-speed roller and the sound-control point, the direction of curvature of said concave surface being opposite to that of the constant speed roller, and means to maintain said film-portion in compression so as to keep the same in contact with said concave surface, said latter means including said constant-speed roller, and a member forming a free loop in the film leaving said concave surface.

7. A film apparatus comprising sound reproducing means including a member having a fixed concave surface at the sound control point, means to move the film at a constant speed past said sound point including a smooth-faced constant-speed roller disposed adjacent said surface to force the film over same and in contact therewith, a sprocket disposed on the opposite side of said surface, the film being formed with a free loop between said sprocket and surface to aid in holding the film against said surface, and means to mechanically record an optically-reproducible sound track on said film at a point on said roller.

JAN JACOB KOTTE.